(12) United States Patent
Sundheimer et al.

(10) Patent No.: US 10,867,177 B2
(45) Date of Patent: Dec. 15, 2020

(54) METHOD AND SYSTEM FOR ESTIMATING AN OPERATING STATE OF A FACILITY VIA IMAGING OF ELECTROMAGNETIC RADIATION

(71) Applicant: Genscape Intangible Holding, Inc., Louisville, KY (US)

(72) Inventors: Brent Sundheimer, Louisville, KY (US); Joseph C. Capone, Boston, MA (US)

(73) Assignee: Genscape Intangible Holding, Inc., Louisville, KY (US)

( * ) Notice: Subject to any disclaimer, the term of this patent is extended or adjusted under 35 U.S.C. 154(b) by 91 days.

(21) Appl. No.: 16/275,796

(22) Filed: Feb. 14, 2019

(65) Prior Publication Data

US 2019/0258844 A1    Aug. 22, 2019

Related U.S. Application Data

(60) Provisional application No. 62/633,349, filed on Feb. 21, 2018.

(51) Int. Cl.
*G06K 9/00* (2006.01)
*G06N 20/00* (2019.01)
*G06K 9/62* (2006.01)
*G06Q 30/02* (2012.01)

(52) U.S. Cl.
CPC ....... *G06K 9/0063* (2013.01); *G06K 9/00771* (2013.01); *G06K 9/6262* (2013.01); *G06N 20/00* (2019.01); *G06Q 30/0201* (2013.01)

(58) Field of Classification Search
CPC ............... G06K 9/0063; G06K 9/6262; G06K 9/00771; G06N 20/00; G06Q 30/0201
USPC ........................................................ 382/103
See application file for complete search history.

(56) References Cited

U.S. PATENT DOCUMENTS

| 8,972,273 | B1 | 3/2015 | Abrishamain et al. |
| 2012/0206595 | A1 | 8/2012 | Alphenaar et al. |
| 2014/0185912 | A1* | 7/2014 | Lim .......................... G06T 7/33 382/141 |

(Continued)

FOREIGN PATENT DOCUMENTS

| JP | 2014-51127 A | 5/2014 |
| WO | 2017/129804 A1 | 8/2017 |

OTHER PUBLICATIONS

Korean Intellectual Property Office, International Search Report and Written Opinion issued in corresponding Application No. PCT/US2019/017983, dated Jun. 5, 2019.

*Primary Examiner* — Congvan Tran

(74) *Attorney, Agent, or Firm* — Stites & Harbison, PLLC; David W. Nagle, Jr.; James R. Hayne

(57) ABSTRACT

In a method and system for estimating an operating state of a facility, an imaging sensor (or camera) is positioned to acquire image data from a facility of interest. Image data received from the imaging sensor is stored and then processed by a computer to identify one or more regions of interest within each image. A model is then created that relates data from the pixels (i.e., pixel values) from one or more of the identified regions of interest in the image data to the operating state for the facility. As new image data is received, that image data is input into the model to estimate the operating state of the facility, and the estimated operating state is then reported to market participants.

17 Claims, 4 Drawing Sheets

(56) References Cited

U.S. PATENT DOCUMENTS

| | | |
|---|---|---|
| 2015/0086071 A1 | 3/2015 | Wu et al. |
| 2016/0132732 A1 | 5/2016 | Gunther et al. |
| 2016/0343124 A1 | 11/2016 | Sundheimer et al. |
| 2019/0340751 A1* | 11/2019 | Kim ................. A61B 6/469 |

* cited by examiner

METHOD AND SYSTEM FOR ESTIMATING AN OPERATING STATE OF A FACILITY VIA IMAGING OF ELECTROMAGNETIC RADIATION

CROSS-REFERENCE TO RELATED APPLICATIONS

The present application claims priority to U.S. Patent Application Ser. No. 62/633,349 filed on Feb. 21, 2018, which is incorporated herein by reference.

BACKGROUND OF THE INVENTION

The present invention is a method and system for estimating an operating state of a facility, such as a power plant, oil refinery, manufacturing facility, etc. via imaging of electromagnetic radiation.

U.S. Pat. No. 8,972,273, which is incorporated herein by reference, describes a method and system for providing information to market participants about one or more power generating units based on thermal image data, a method and system that allows for an accurate assessment of the operational status of a particular power plant, including an identification of which power generating units are on and which are off.

As described in U.S. Pat. No. 8,972,273, an exemplary system generally includes four components: (1) a monitor component for acquiring thermal data from a smokestack and/or the gas plume emitted from the smokestack of a power plant; (2) a video capture component for recording images of the acquired thermal data; (3) a data transmission component for transmitting the recorded images to a central processing facility; and (4) an analysis component for analyzing the recorded images and, using one or more databases storing information regarding the nature and capability of that power plant, drawing an inference as to the operational status of that power plant. Using such a system, the resultant information can then be used to assess regional electricity supply and forecast wholesale electricity prices.

In U.S. Pat. No. 8,972,273, the monitor component (or monitor) is preferably comprised of a commercially-available device, such as a thermal imaging camera, scanner, detector, etc., that is coupled to a lens or other optical arrangement with an adequate focal length to focus on a smokestack and/or the gas plume emitted from a smokestack of a power plant that is being monitored. The monitor is installed at a selected location and is focused on one or more smokestacks of the power plant to be monitored. The monitor acquires thermal data by detecting and identifying areas of a smokestack and/or the gas plume emitted from a smokestack which are hotter than the ambient temperature of the air surrounding the smokestack.

In U.S. Pat. No. 8,972,273, the video capture component is used to record images of the acquired thermal data. In one exemplary embodiment, the video capture component includes a central processing unit (CPU), which receives acquired thermal data from the monitor through a graphics or video capture board. The acquired thermal data is stored in memory associated with the CPU either in individual image files or in video files. A digital computer program associated with the CPU manages: (i) the transfer of the acquired thermal data from the monitor to the CPU; (ii) the recording and storage of the acquired thermal data in memory associated with the CPU as individual image files or in video files; and (iii) the transmission of the recorded images to a central processing facility, as further described below.

In U.S. Pat. No. 8,972,273, the data transmission component is connected to the CPU and provides for the transmission of the recorded images to the central processing facility, for example, through an Internet connection or other known data transmission means. At the central processing facility, the analysis component analyzes the recorded images and, using one or more databases storing information regarding the nature and capability of the monitored power plant, draws an inference as to the operational status of that power plant.

Finally, in U.S. Pat. No. 8,972,273, information about the operational status of one or more power generating units and/or power plants is communicated to third parties, i.e., market participants. To the extent that the recorded images can be transmitted to the central processing facility in substantially real-time, information can then be communicated to market participants in substantially real-time.

However, as described above, in U.S. Pat. No. 8,972,273, the focus is solely on a power plant and acquiring thermal data from a smokestack and/or the gas plume emitted from the smokestack of a power plant.

Furthermore, known technologies require a large amount of technical knowledge and expertise, as well as evaluation time, to create each instantiation of the algorithm. This is particularly problematic when a large number of facilities are being monitored. It would thus be desirable to employ a method and system that can monitor and estimate the operating state of a facility without undue effort or a high degree of technical knowledge or expertise.

SUMMARY OF THE INVENTION

The present invention is a method and system for estimating an operating state of a facility, such as a power plant, oil refinery, manufacturing facility, etc. via imaging of electromagnetic radiation. Furthermore, the method and system of the present invention does not rely solely on acquiring thermal data from a smokestack and/or the gas plume emitted from the smokestack of a power plant, but rather may acquire and use imagery of a broader range of components and equipment of a facility.

An exemplary system made in accordance with the present invention thus includes an imaging sensor (or camera), which is positioned to acquire image data from a facility of interest. Such an imaging sensor may capture and include electromagnetic radiation in the visible or invisible (infrared) spectrum, and then communicates the acquired image data to a computer for subsequent processing and analysis.

An exemplary method in accordance with the present invention thus commences with the receipt of the image data from the imaging sensor. As the image data is received from the imaging sensor (or camera), it is stored in a database. Once the image data has been received and stored, it is processed by the computer to identify one or more regions of interest within each image included in the image data. Using the database of image data and a database of historical operating state data for the facility, a model is then created that relates data from the pixels (i.e., pixel values) from one or more of the identified regions of interest in the image data to the operating state for the facility (or unit of the facility). For instance, in some implementations, in generating the model, the historical operating state data and the data extracted from the one or more regions of interest in the image data for the same time period is used as an input to a machine learning training algorithm, with each input node representing the pixel value (intensity) of each of the pixels in an identified region of interest. After training, a model will have been generated which maps a single output to a series of individual weights to each of the pixels in the identified region of interest.

Once the model has been generated for a particular facility (or a unit of the facility), it is stored in a memory component of a computer. As new image data is received, that image data is input into the model to estimate the operating state of the facility (or a unit of the facility). The estimated operating state of the facility (or a unit of the facility) is then reported to market participants, i.e., third parties who would not ordinarily have ready access to such information. It is contemplated and preferred that such reporting to market participants could be achieved through electronic mail delivery and/or through export of the data to an access-controlled Internet web site, which market participants can access through a common Internet browser program.

The above-described operational and computational steps of this method are preferably achieved through the use of a digital computer program (i.e., computer-readable instructions executed by a processor of a computer) that includes appropriate modules for executing the requisite instructions (which are stored in a memory component or similar computer-readable medium). Thus, an exemplary system for estimating an operating state of a facility in accordance with the present invention may also be characterized as including: (a) an imaging sensor; (b) a data receiving module for receiving image data from the imaging sensor; (c) an identification module for identifying one or more regions of interest within each image included in the image data; (d) an analysis module for (i) retrieving historical operating state data for the facility from a database, (ii) generating a model that relates pixel data from the one or more regions of interest within each image to an operating state of the facility, and (iii) applying the model to subsequently received image data for a particular time period to generate an estimate of the operating state of the facility for the particular time period; and (e) a reporting module for reporting the estimate of the operating state of the facility to a market participant.

DETAILED DESCRIPTION OF THE INVENTION

The present invention is a method and system for estimating an operating state of a facility, such as a power plant, oil refinery, manufacturing facility, etc. via imaging of electromagnetic radiation. Furthermore, the method and system of the present invention does not rely solely on acquiring thermal data from a smokestack and/or the gas plume emitted from the smokestack of a power plant, but rather may acquire and use imagery of a broader range of components and equipment of a facility.

Figure 1:
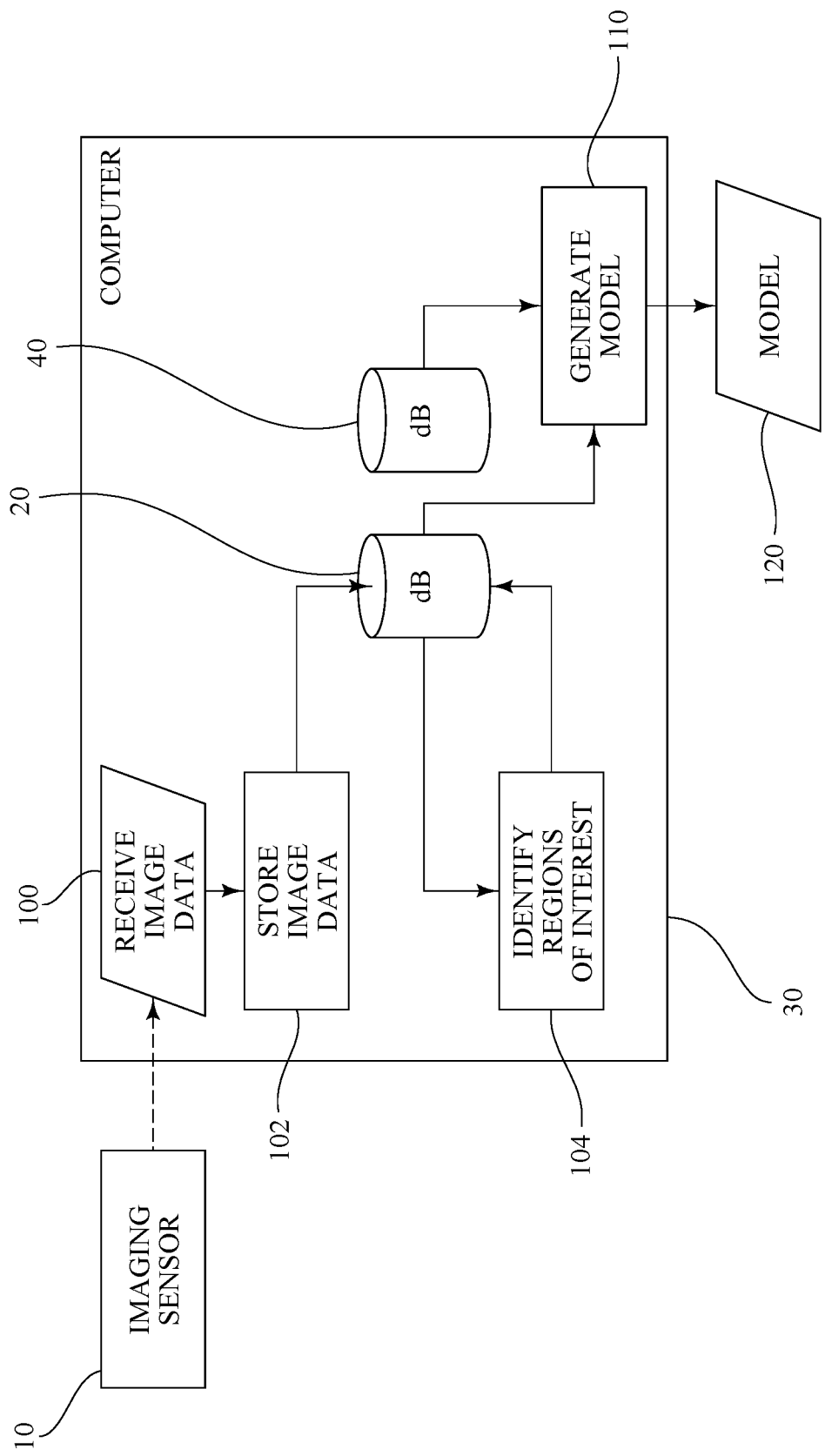
FIG. 1 is a flow chart depicting the general functionality of an exemplary implementation of a method for estimating an operating state of a facility in accordance with the present invention.

Referring now to FIG. 1, an exemplary system made in accordance with the present invention thus includes an imaging sensor (or camera) 10, which is positioned to acquire image data from a facility of interest. Such an imaging sensor 10 may capture and include electromagnetic radiation in the visible or invisible (infrared) spectrum, and then communicates the acquired image data to a computer 30 for subsequent processing and analysis. For example, one suitable imaging sensor for capturing electromagnetic radiation in the visible spectrum is an AXIS Q176-LE network camera manufactured and distributed by Axis Communications AB of Lund, Sweden. For another example, suitable imaging sensors for capturing electromagnetic radiation in the invisible (infrared) spectrum include certain FC-series thermal imaging cameras manufactured and distributed by FLIR Systems of Wilsonville, Oreg. In some implementations, the acquired image data is communicated to a computer at a central processing facility for subsequent processing and analysis, for example, through an Internet connection or other known data transmission means.

Referring still to FIG. 1, an exemplary method in accordance with the present invention thus commences with the receipt of the image data from the imaging sensor 10, as indicated by block 100 of FIG. 1. As the image data is received from the imaging sensor (or camera) 10, it is stored in a database 20, as indicated by block 102 of FIG. 1.

Referring still to FIG. 1, once the image data has been received and stored, it is processed by the computer 30 (as shown in FIG. 1) to identify one or more regions of interest within each image included in the image data, as indicated by block 104 of FIG. 1. For instance, each region of interest may correspond to a particular component of the facility. Such identification of each region of interest in an image can be achieved, for example, via visual inspection of images by trained personnel or via machine-assisted examination of the image, in combination with known information about a facility, such as information contained in permits filed with the Environmental Protection Agency. The identification of these regions of interest is also preferably stored in the database 20. Thus, although the imaging sensor (or camera) 10 may have a wide field of view, the subsequent analysis focuses on the identified regions of interest.

Figure 3:
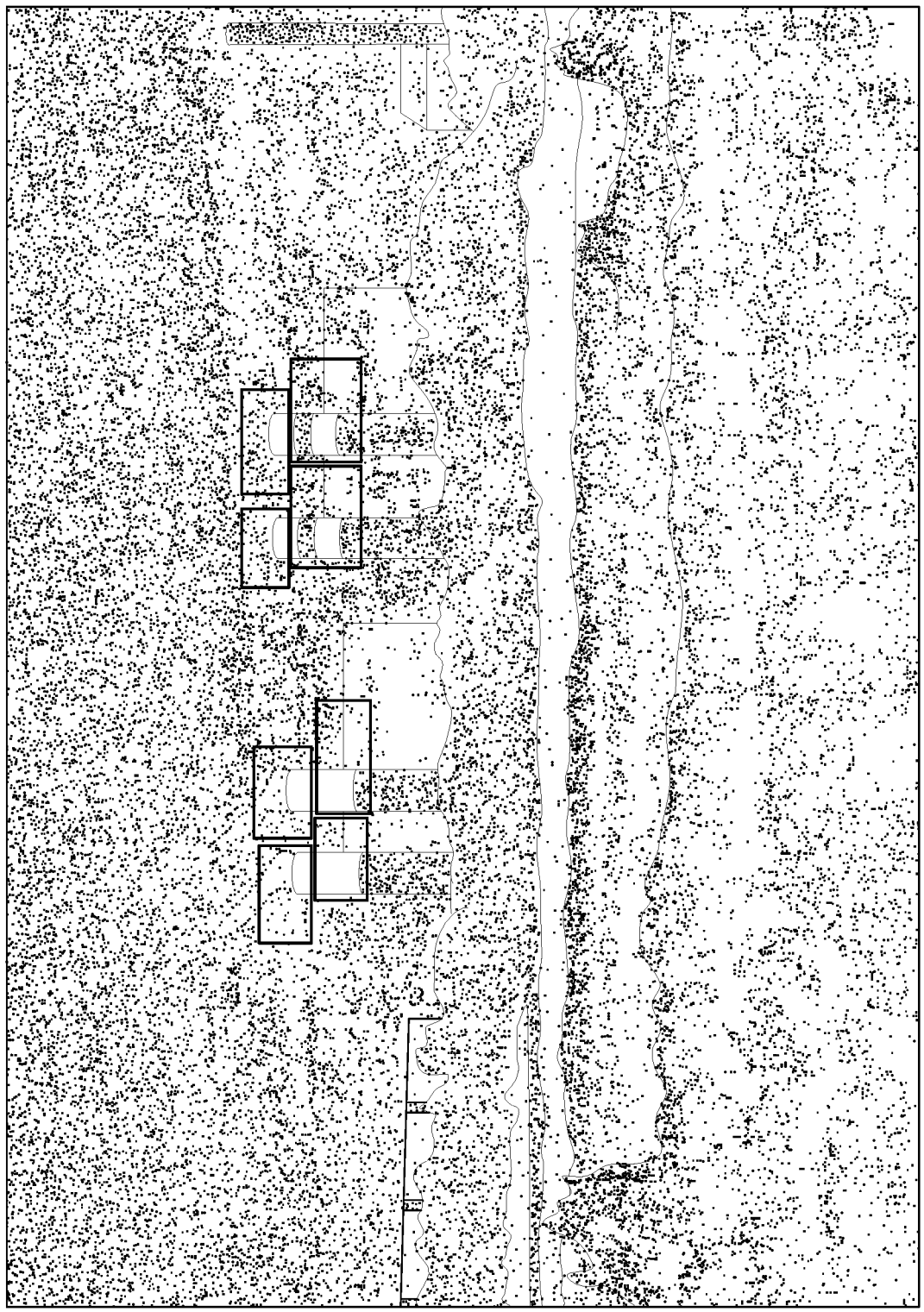
FIG. 3 is an exemplary image in which multiple regions of interest have been identified.

FIG. 3 is an exemplary image in which multiple regions of interest (bounded by rectangles) have been identified. In this case, each rectangle corresponds to an area surrounding the stack and plume of a generating unit of a power plant. Once these regions of interest have been identified, the coordinates for each of the regions of interest are stored in the database 20.

Referring again to FIG. 1, the exemplary system also includes a database 40 of historical operating state data for the facility. Such historical operating state data may include information about the overall operating state of the facility at a particular point in time, as well as information about the operating state of particular units within the facility. For example, a particular unit within a facility may be identified as "on" if the unit was in operation at a particular point in time and "off" if the unit was not in operation at that particular point in time. Such historical operating state data may be acquired and compiled from publicly available data sources, such as the "Air Markets Program Data" from the U.S. Environmental Protection Agency or from trained personnel viewing historical imagery and/or other information about a facility.

Using the database 20 of image data and the database 40 of historical operating state data for the facility, a model 120 is then created that relates data from the pixels (i.e., pixel values) from one or more of the identified regions of interest in the image data to the operating state for the facility (or unit of the facility), as indicated by block 110 of FIG. 1.

In this exemplary implementation, in generating the model, training and testing sets are created for one or more regions of interest. Both the training and testing sets are compiled with a portion of the historical operating state data where the monitored facility (or a unit of the facility) is at each of the known operating states of the facility (or a unit of the facility). From each one of the time periods where the facility (or a unit of the facility) was in a particular operating state, data is extracted from the one or more regions of interest in the image data associated with that time period, where the extracted data includes the pixel values (which, in most cases, are representative of pixel intensity) in the one or more regions of interest.

As a further refinement, with respect to pixel intensity, in some cases, certain areas within a region of interest may be obscured or at least partially obscured by, for example, fog or cloud cover. In such cases, if the maximum and/or minimum intensity values in a region of interest are outside of defined thresholds for a particular time period, the image data may be discarded. Similarly, if maximum and minimum pixel intensities are sufficiently close to each other, presenting low contrast, the image data may be discarded.

In this exemplary implementation, in generating the model, the historical operating state data and the data extracted from the one or more regions of interest in the image data for the same time period is then used as an input to a machine learning training algorithm. This algorithm can be any machine learning algorithm, including, for example, a neural network, k-nearest neighbor, decision tree, etc.

In one exemplary implementation, an artificial neural network (ANN) is used to generate the model 120. In such an implementation, each input node will be the pixel value (intensity) of each of the pixels in an identified region of interest. After training, a model will have been generated which maps a single output to a series of individual weights to each of the pixels in the identified region of interest. This series of weights is then stored in the model 120.

With respect to use of an ANN, an existing software library, such as the open source Aforge.net library, can be used to build the artificial neural network. An activation network is first initialized with a type of activation function, such as a bipolar sigmoid. Then, the type of learning, such as resilient back propagation, is chosen. A matrix of pixels, state, and other ancillary information is input into a function that performs the iterative training refinement through the RunEpoch function, which then creates a mapping from pixel value (intensity) into an operating state.

Figure 2:
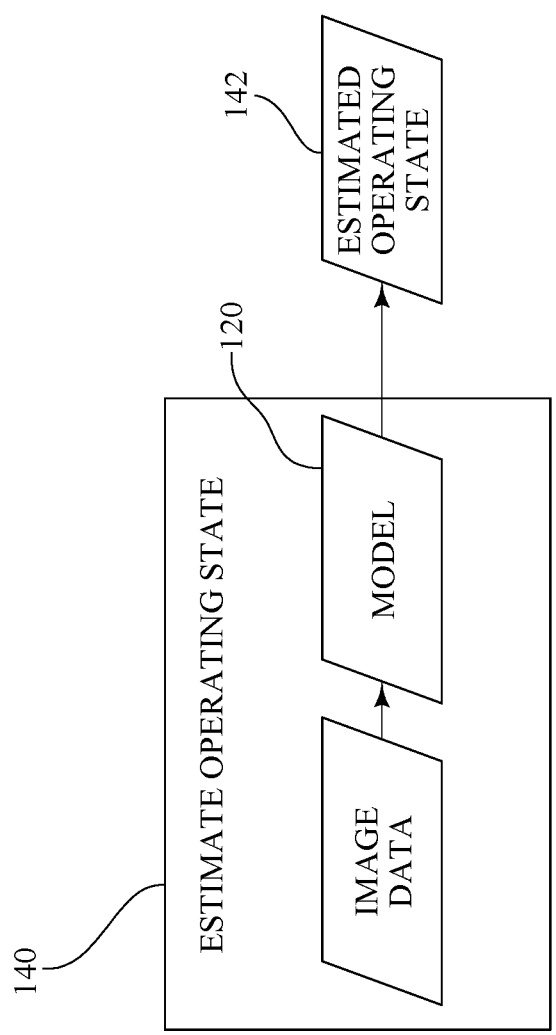
FIG. 2 is a flow chart depicting the application of the model, which is the output from the flow chart of FIG. 1, to estimate the operating state of a facility.

Referring now to FIG. 2, once the model 120 has been generated for a particular facility (or a unit of the facility), it is stored in a memory component of a computer. As new image data is received, that image data is input into the model 120 to estimate the operating state of the facility (or a unit of the facility), as indicated by block 140 and output 142 in FIG. 2. The estimated operating state of the facility (or a unit of the facility) is then reported to market participants, i.e., third parties who would not ordinarily have ready access to such information. It is contemplated and preferred that such reporting to market participants could be achieved through electronic mail delivery and/or through export of the data to an access-controlled Internet web site, which market participants can access through a common Internet browser program.

Specifically, in the above-described exemplary implementation using an artificial neural network (ANN), the series of weights is stored in the model 120. Thus, as new image data is received and a region of interest is identified, the series of weights is applied to the pixel values (intensity) in the region of interest. The result is a single number which describes the operating state of the facility (or a unit of the facility). This single number is compared to integers representing each known operating state of the facility (or a unit of the facility), with the estimate of the current operating state being selected based on the closest integer. For example, in its simplest form, the integer may be 0 or 1, representing an operating state that is either "off" or "on." In other words, the output from the model 120 simply estimates (or predicts) that the facility (or a unit of the facility) is "off" or "on."

As a further refinement, the operating state can be further correlated to typical operating parameters, and that information can also be reported to market participants. For example, if a unit of a power generating facility is monitored, the operating state may be correlated to a power output. For another example, if an oil refinery is monitored, the operating state may be correlated to a production output (i.e., barrels per day).

As a further refinement, since a unit may take time to ramp up or ramp down, a weighting factor may also be applied to any detected changes of state. For example, for a 100-MW power generating facility, if the frequency of received image data is every five minutes, and the unit typically takes 25 minutes to ramp up to full production, a weighting factor of 20% could be applied. Thus, if the unit is off and then is detected to have turned on, the estimated capacity after the first image would be 20 MW, after the second 40 MW, and so forth until the maximum capacity of 100 MW is reached.

Figure 4:
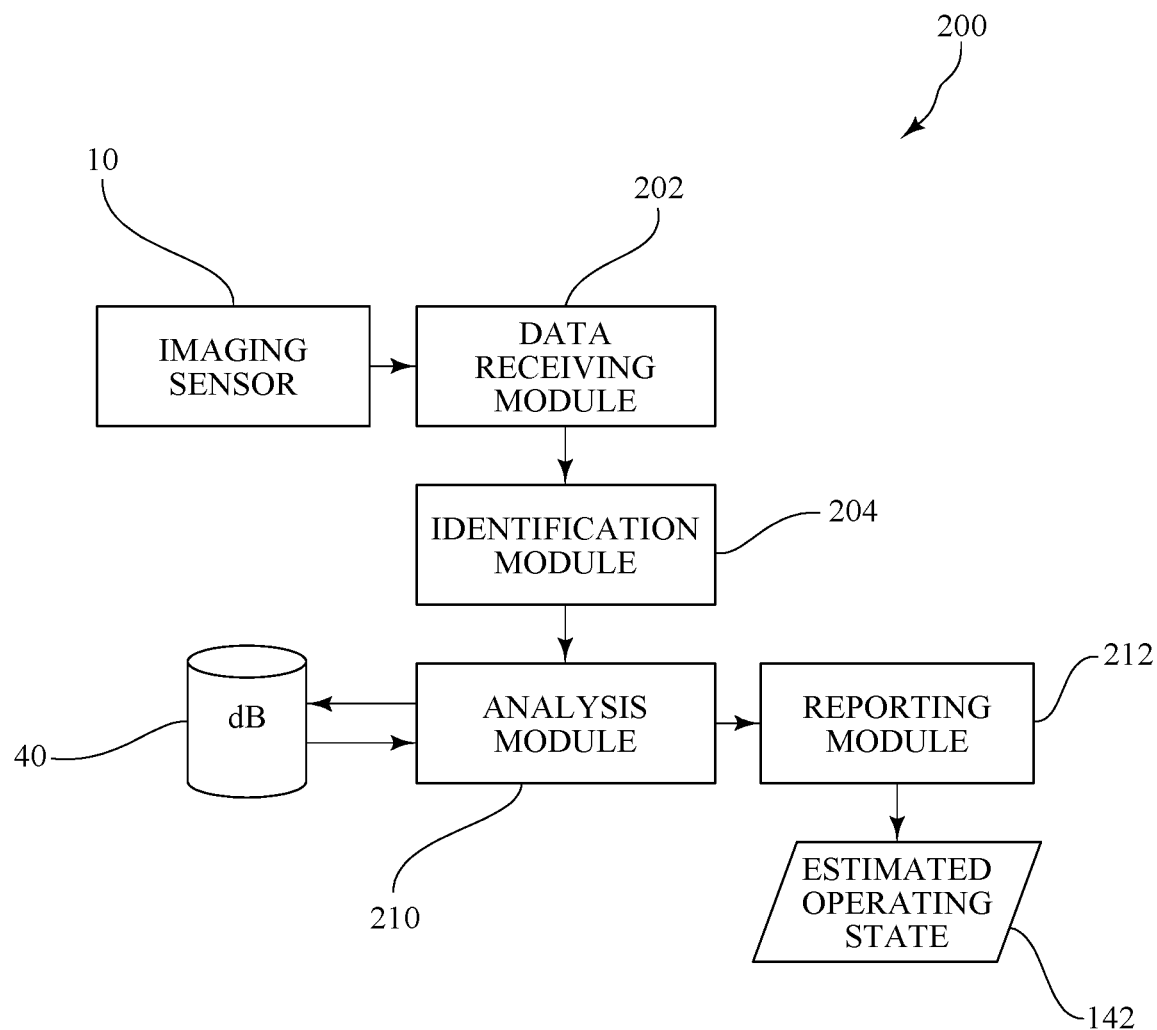
FIG. 4 is a schematic representation of an exemplary system for estimating an operating state of a facility in accordance with the present invention.

As indicated above, the above-described operational and computational steps of this method are preferably achieved through the use of a digital computer program (i.e., computer-readable instructions executed by a processor of a computer) that includes appropriate modules for executing the requisite instructions (which are stored in a memory component or similar computer-readable medium). Thus, as illustrated in FIG. 4, an exemplary system 200 for estimating an operating state of a facility in accordance with the present invention may also be characterized as including: (a) an imaging sensor 10; (b) a data receiving module 202 for receiving image data from the imaging sensor 10; (c) an identification module 204 for identifying one or more regions of interest within each image included in the image data; (d) an analysis module 210 for (i) retrieving historical operating state data for the facility from a database 40, (ii) generating a model that relates pixel data from the one or more regions of interest within each image to an operating state of the facility, and (iii) applying the model to subsequently received image data for a particular time period to generate an estimate of the operating state of the facility for the particular time period; and (e) a reporting module 212 for reporting the estimate of the operating state of the facility to a market participant.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for estimating an operating state of a facility, comprising:
   an imaging sensor positioned to acquire image data of the facility;
   a database of historical operating state data for the facility; and
   a computer with a processor for executing instructions stored in a computer-readable medium for
      receiving image data for the facility from the imaging sensor,
      identifying one or more regions of interest within each image included in the image data,
      retrieving historical operating state data for the facility from the database,
      generating a model, via machine learning, that relates pixel data from the one or more regions of interest within each image to an operating state of the facility,
      storing the model in a memory component,
      receiving, at a subsequent time, image data for a particular time period, and then inputting the image data into the model as stored in the memory component to generate an estimate of the operating state of the facility for the particular time period, and
      electronically outputting and reporting the estimate of the operating state of the facility for the particular time period to market participants.

2. The system as recited in claim 1, wherein the pixel data is pixel intensity data.

3. The system as recited in claim 1, wherein the operating state is on or off.

4. The system as recited in claim 1, wherein the facility is selected from the group consisting of a power plant, an oil refinery, and a manufacturing facility.

5. The system as recited in claim 1, wherein the imaging sensor is positioned at a location remote from the facility.

6. A system for estimating an operating state of a facility, comprising:
   an imaging sensor positioned at a location remote from the facility and configured to acquire image data of the facility;
   a data receiving module for receiving image data from the imaging sensor;
   an identification module for identifying one or more regions of interest within each image included in the image data;
   an analysis module for
      (i) retrieving historical operating state data for the facility from a database,
      (ii) generating a model that relates pixel data from the one or more regions of interest within each image to an operating state of the facility, and
      (iii) applying the model to subsequently received image data for a particular time period to generate an estimate of the operating state of the facility for the particular time period;
   a reporting module for reporting the estimate of the operating state of the facility to a market participant.

7. The system as recited in claim 6, wherein the pixel data is pixel intensity data.

8. The system as recited in claim 6, wherein the operating state is on or off.

9. The system as recited in claim 6, wherein the facility is selected from the group consisting of a power plant, an oil refinery, and a manufacturing facility.

10. A method for estimating an operating state of a facility, comprising the steps of:
    receiving, via a computer, image data for the facility;
    using the computer to identify one or more regions of interest within each image included in the image data;
    using the computer to retrieve historical operating state data for the facility;
    generating a model, via machine learning, that relates pixel data from the one or more regions of interest within each image to an operating state of the facility;
    storing the model in a memory component;
    receiving, at a subsequent time, image data for a particular time period, and then inputting the image data into the model as stored in the memory component to generate an estimate of the operating state of the facility for the particular time period; and
    electronically outputting and reporting the estimate of the operating state of the facility for the particular time period to market participants.

11. The method as recited in claim 10, wherein the pixel data is pixel intensity data.

12. The method as recited in claim 10, wherein the operating state is on or off.

13. The method as recited in claim 10, wherein the facility is selected from the group consisting of a power plant, an oil refinery, and a manufacturing facility.

14. The method as recited in claim 10, wherein the image data is acquired by an imaging sensor positioned at a location remote from the facility.

15. A method for estimating an operating state of a unit of a facility,
    receiving, via a computer, image data for the facility, wherein the image data is acquired by an imaging sensor positioned at a location remote from the facility;
    using the computer to identify at least one region of interest within each image included in the image data, the at least one region of interest corresponding to the unit of the facility;
    using the computer to retrieve historical operating state data for the unit of the facility;
    generating a model, via machine learning, that relates pixel data from the at least one region of interest to an operating state of the unit of the facility;
    storing the model in a memory component;
    receiving, at a subsequent time, image data for a particular time period, and then inputting the image data into the model as stored in the memory component to generate an estimate of the operating state of the unit of the facility for the particular time period; and
    electronically outputting and reporting the estimate of the operating state of the unit of the facility for the particular time period to market participants.

16. The method as recited in claim 15, wherein the pixel data is pixel intensity data.

17. The method as recited in claim 15, wherein the operating state is on or off.

* * * * *